(12) United States Patent
Onoda et al.

(10) Patent No.: US 7,900,998 B2
(45) Date of Patent: Mar. 8, 2011

(54) VEHICLE BODY FLOOR STRUCTURE

(75) Inventors: Yasunobu Onoda, Wako (JP); Yoshiyuki Toba, Tochigi (JP)

(73) Assignee: Honda Motor Co., Ltd., Tokyo (JP)

( * ) Notice: Subject to any disclaimer, the term of this patent is extended or adjusted under 35 U.S.C. 154(b) by 0 days.

(21) Appl. No.: 12/594,291

(22) PCT Filed: Jun. 2, 2008

(86) PCT No.: PCT/JP2008/060505
§ 371 (c)(1),
(2), (4) Date: Oct. 1, 2009

(87) PCT Pub. No.: WO2008/156000
PCT Pub. Date: Dec. 24, 2008

(65) Prior Publication Data
US 2010/0078966 A1   Apr. 1, 2010

(30) Foreign Application Priority Data
Jun. 19, 2007   (JP) .................................. 2007-161063

(51) Int. Cl.
*B62D 27/00* (2006.01)

(52) U.S. Cl. ...................................................... 296/208
(58) Field of Classification Search .................. 296/208, 296/187.08, 193.07
See application file for complete search history.

(56) References Cited

U.S. PATENT DOCUMENTS

| | | | | |
|---|---|---|---|---|
| 3,494,657 | A * | 2/1970 | Harper et al. | 296/208 |
| 5,876,090 | A * | 3/1999 | Kawaguti | 296/208 |
| 6,318,796 | B1 * | 11/2001 | Felsen | 296/208 |
| 6,626,477 | B2 * | 9/2003 | Maynard et al. | 296/24.3 |

FOREIGN PATENT DOCUMENTS

JP   2007-032304   2/2007

* cited by examiner

*Primary Examiner* — Joseph D Pape
(74) *Attorney, Agent, or Firm* — Rankin, Hill & Clark LLP

(57) ABSTRACT

Vehicle body floor structure includes a floor frame of an upwardly-opening U sectional shape extending in a length direction of a vehicle centrally on a floor panel provided in a floor section of a vehicle compartment, and a collective piping bracket provided under the floor panel between a flange of the floor frame and an outer surface of the floor panel. The collective piping bracket is fixedly joined to the flange of the floor frame in spaced-apart relation to the floor panel.

5 Claims, 7 Drawing Sheets

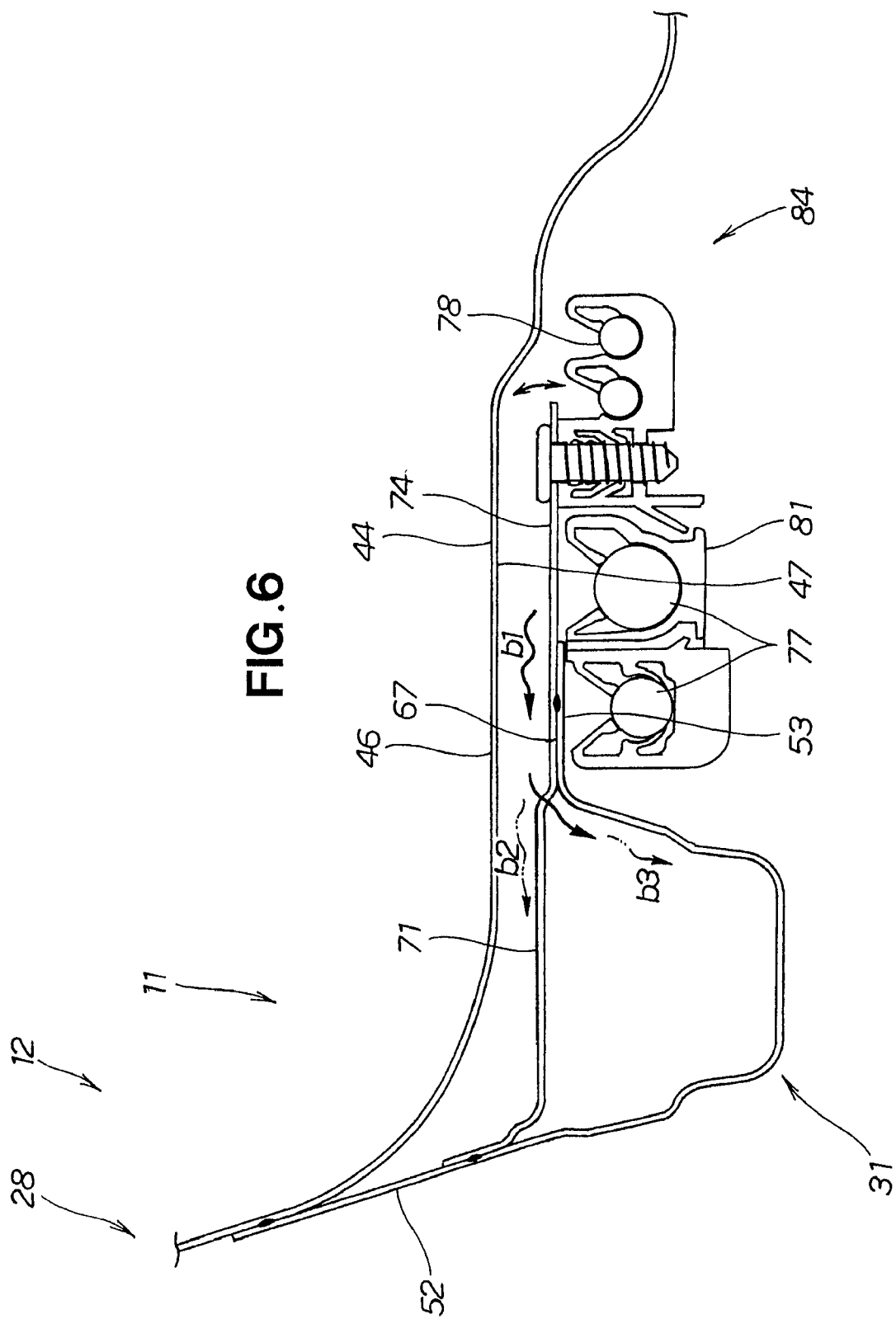

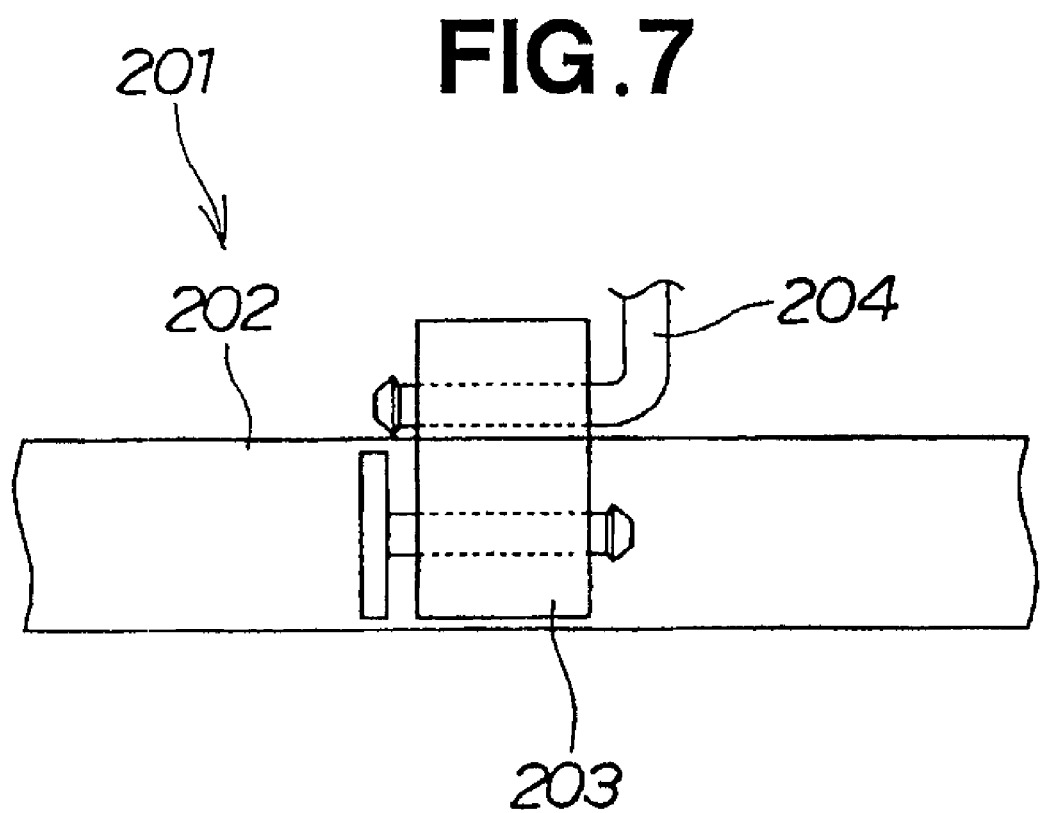

VEHICLE BODY FLOOR STRUCTURE

TECHNICAL FIELD

The present invention relates to vehicle body floor structures supporting pipes and electric wires.

BACKGROUND ART

In some vehicles, pipes and electric wires are disposed in a vehicle's bottom section and fixed by supporting members. For example, Japanese Patent Application Laid-Open Publication No. 2007-32304 (JP 2007-032304 A) discloses a structure which an exhaust pipe is hung via resilient members.

FIG. 7 hereof shows an exhaust system support structure 201 disclosed in JP 2007-032304 A, where an exhaust system including a tail pipe 202 is supported via resilient members (e.g., rubber members) 203 at a plurality of positions on a vehicle body (only one such resilient member 203 is shown in FIG. 7). Thus, the disclosed structure can enhance a vibration suppressing function. With the disclosed exhaust system support structure 201, however, the vibration suppressing function can not be enhanced as desired because vibrations that can not be absorbed by the resilient members 203 are undesirably transmitted to a vehicle body via a bracket 204 mounted to the vehicle body. Further, because the disclosed exhaust system support structure 201 requires provision of the resilient members 203 on the vehicle body and thus would require increased manufacturing cost.

DISCLOSURE OF THE INVENTION

It is therefore an object of the present invention to provide an improved vehicle body floor structure which can effectively suppress vibrations from a pipe and electric wires supported on a bottom of the vehicle.

In order to accomplish the above-mentioned object, the present invention provides an improved vehicle body floor structure, which comprises: a floor frame of upwardly-oriented U-shaped section disposed on a floor panel provided in a floor section of a compartment of a vehicle, the floor frame having a first flange and a second flange which are provided at ends of the U shape; and a collective piping bracket disposed under the floor panel between the second flange of the floor frame and an outer surface of the floor panel, the collective piping bracket being fixedly joined to the second flange of the floor frame and spaced apart from the floor panel.

When a pipe and electric wires mounted to the collective piping bracket vibrate, the vibrations transmit to the floor frame without transmitting to the floor panel spaced apart from the collective piping bracket. Thus, the vehicle body floor structure of the present invention can effectively prevent vibrations from the pipe and electric wires supported in the bottom section of the vehicle.

Further, because the vehicle body floor structure of the present invention includes the collective piping bracket disposed under the floor panel between another flange of the floor frame and the outer surface of the floor panel and the collective piping bracket is fixedly joined to the flange of the floor frame in spaced-apart relation to the floor panel, no vibration absorbing member, such as rubber, has to be provided between the piping bracket and the floor panel, it is possible to reduce necessary manufacturing cost.

Preferably, the second flange of the floor frame is of a concavo-convex shape having low-height and high-height portions and is welded at the low-height portion to the collective piping bracket and welded at the high-height portion to the floor panel.

Desirably, the collective piping bracket is fixed to both of the first flange and a second flange, spaced apart from the first flange, of the floor frame.

In a preferred form, the floor structure further comprises a tunnel section extending longitudinally of the vehicle and having side walls and the floor frame is provided at ends of the side walls of the tunnel section and extending along the tunnel section.

In a further preferred form, the vehicle body floor structure further comprises a side sill extending rearwardly of the vehicle and the side walls of the tunnel section are formed a step higher than the side sill.

BRIEF DESCRIPTION OF DRAWINGS

FIG. 6 is a view similar to FIG. 5 but illustrating a vibration absorbing mechanism of the vehicle body floor structure; and FIG. 7 is a view explanatory of a relevant conventionally-known technique.

BEST MODE FOR CARRYING OUT THE INVENTION

Figure 1:
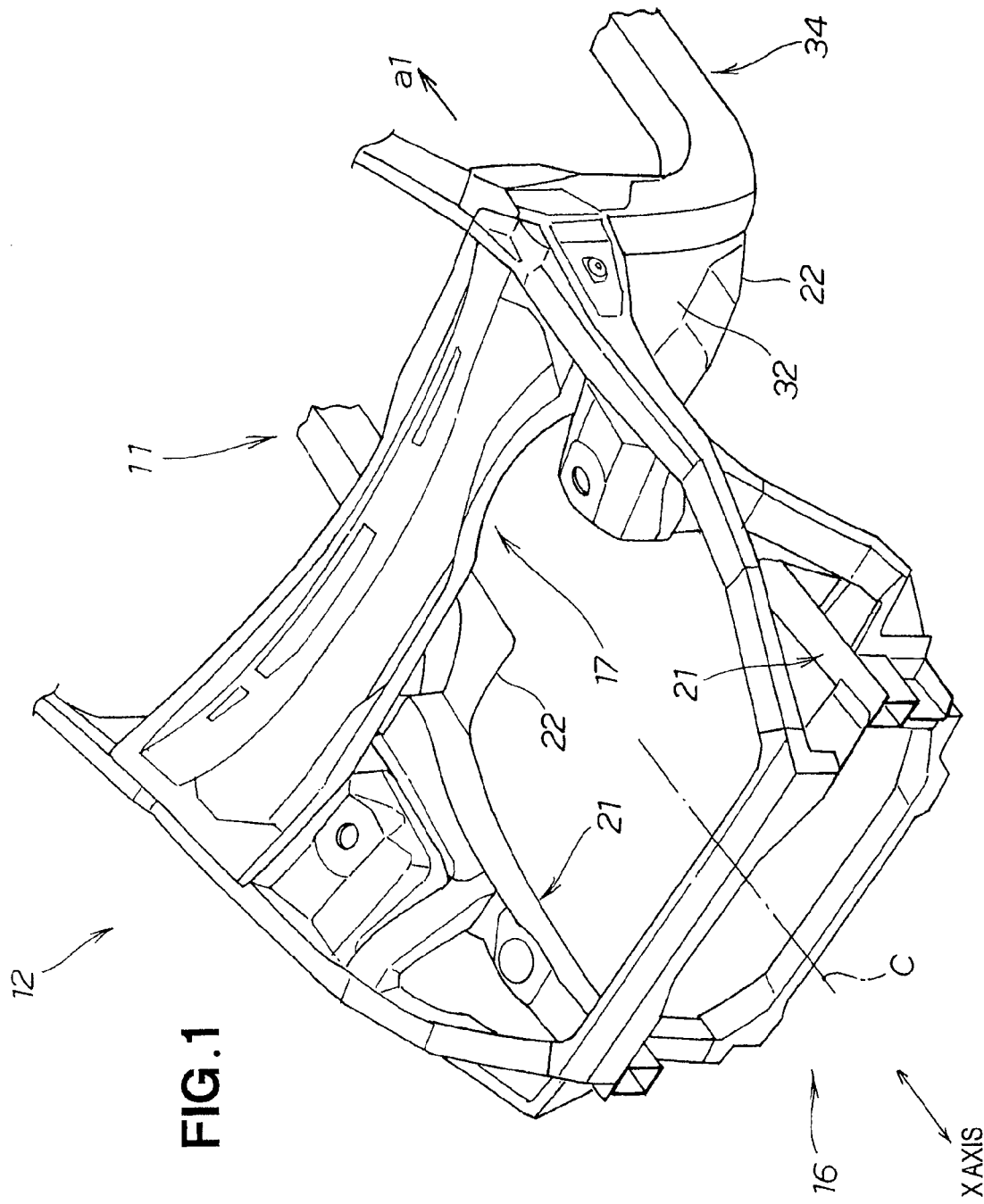
FIG. 1 is a perspective view of a vehicle front body connecting to a vehicle body floor structure according to an embodiment of the present invention.
Figure 2:
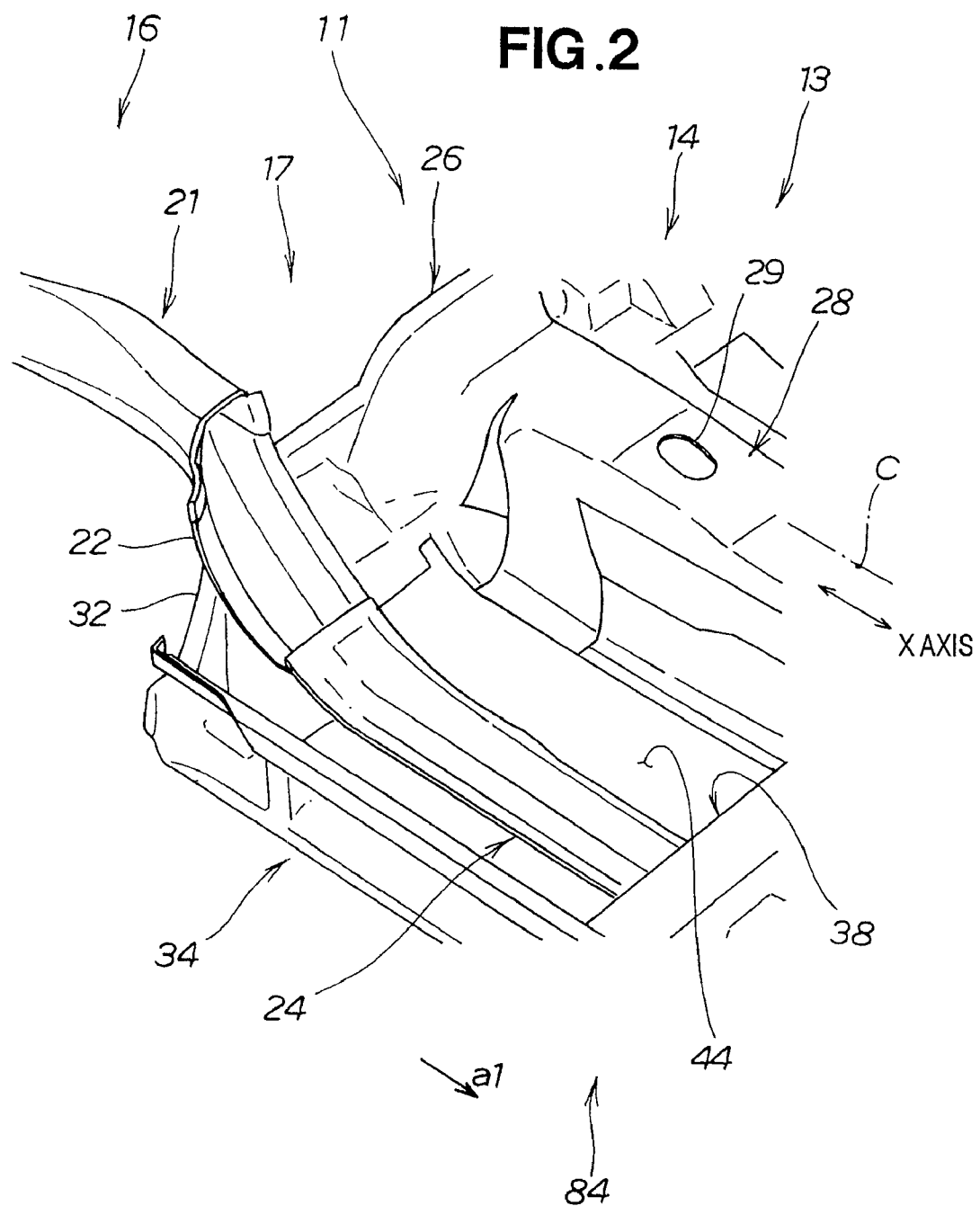
FIG. 2 is a perspective view of a front floor frame connecting to the vehicle body floor structure of the present invention.

Reference is now made to FIG. 1 showing in perspective a front body connecting to a vehicle body floor structure according to an embodiment of the present invention and FIG. 2 showing in perspective a front floor frame connecting to the vehicle body floor structure.

The vehicle body floor structure 11 is employed in a floor body 14 that constitutes a floor of a compartment 13 of a vehicle 12; details of the vehicle body floor structure 11 will be discussed later.

The vehicle 12 includes the floor body 14 constituting the floor, left and right side bodies (not shown) that constitute side walls of the vehicle compartment 13, a front body 16 disposed in front of the vehicle compartment 13, and a dashboard 17 that constitutes a wall separating the front body 16 from the vehicle compartment 13.

The front body 16 includes left and right front side frames 21 that are located in substantial left-right symmetrical relation to each other about a longitudinal centerline C of the vehicle 12. Front floor frames 24 connecting to respective rear ends 22 of the front side frames 21 extend toward the longitudinal middle of the floor body 14 (i.e., in a direction of arrow a1). The floor body 14 includes the vehicle body floor structure 11 of the invention.

Figure 3:
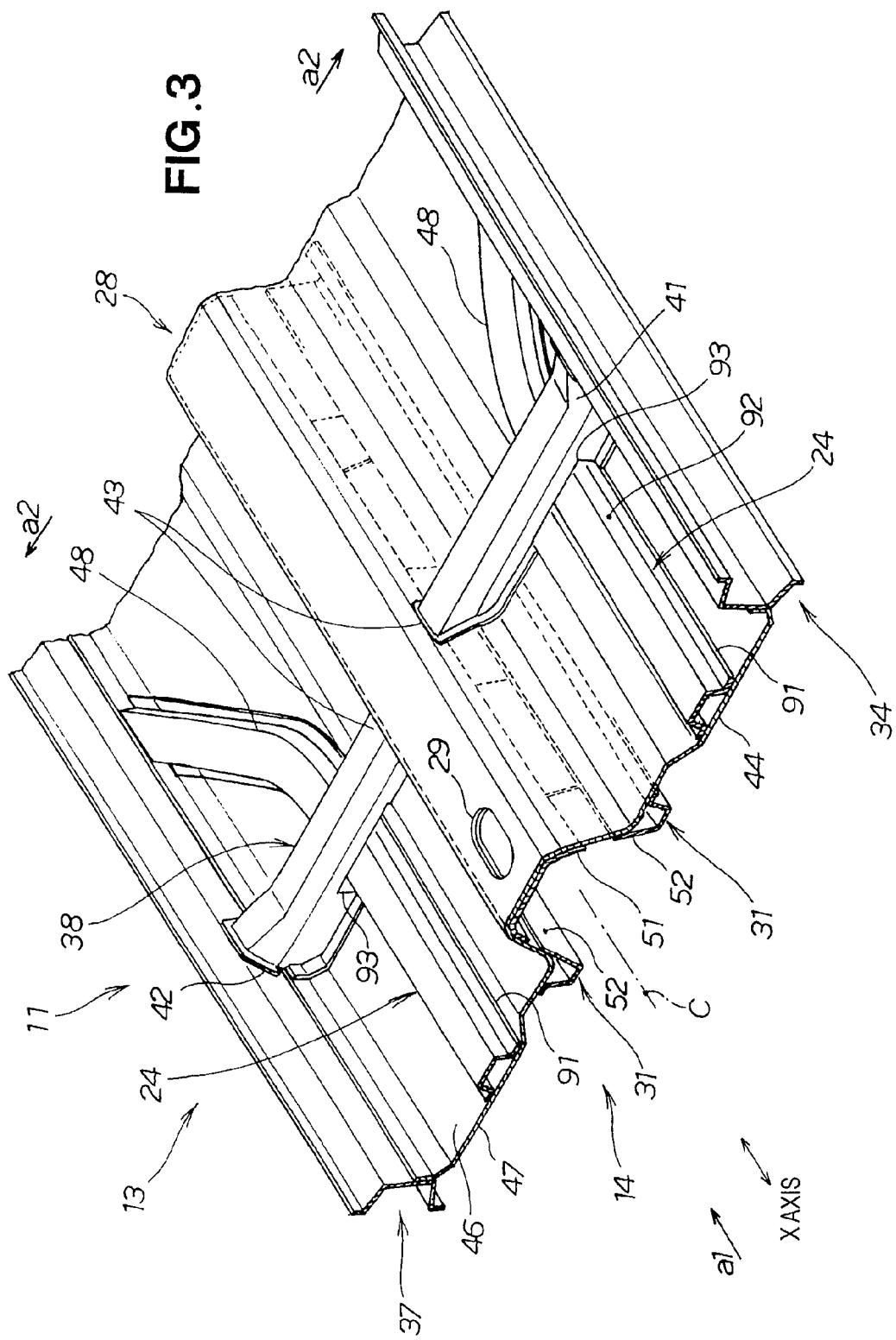
FIG. 3 is a perspective view of the vehicle body floor structure of the present invention.

FIG. 3 is a perspective view of the vehicle body floor structure 11, and the vehicle body floor structure 11 will be described below with reference to FIGS. 1, 2 and 3. The vehicle body floor structure 11 includes: a dashboard cross member 26 connected to the lower end of the dashboard 17 located in front thereof and connected to the rear ends of the left and right side frames 21; a tunnel section 28 having an opening 29 and extending from a middle region of the dashboard cross member 26 in the longitudinal or length direction (X-axis direction) of the vehicle; and left and right tunnel frames 31 fixedly joined to the left and right side edges of the tunnel section 28.

The vehicle body floor structure 11 provided in the floor body 14 further includes: a left side sill 34 connected to one (left in the illustrated example) of the dashboard cross member 26 and extending rearward in the length direction (i.e., in the direction of arrow a1); a right side sill 37 connected to the other (right in the illustrated example) of the dashboard cross member 26 and extending rearward in the length direction in parallel to the left side sill 34; and a floor cross member 38 disposed between the left and right side sills 34 and 37. The floor cross member 38 has a left end 41 fixedly joined to the left side sill 34, a right end 42 fixedly joined to the right side sill 37, and middle portions 43 fixedly joined to the tunnel section 28.

The vehicle body floor structure 11 further includes a floor panel 44 fixedly joined to the underside of the floor cross member 38, and the floor panel 44 has its left and right side edges fixedly joined to the left and right side sills 34 and 37, respectively. The floor panel 44 also has a middle portion fixedly joined to the tunnel section 28, an inner (upper in the figure) surface 46 facing the interior of the vehicle compartment 13 and an outer (lower in the figure) surface 47 facing the ground surface. The tunnel frames 31 are fixedly joined to the outer surface 47 of the floor panel 44.

Figure 4:
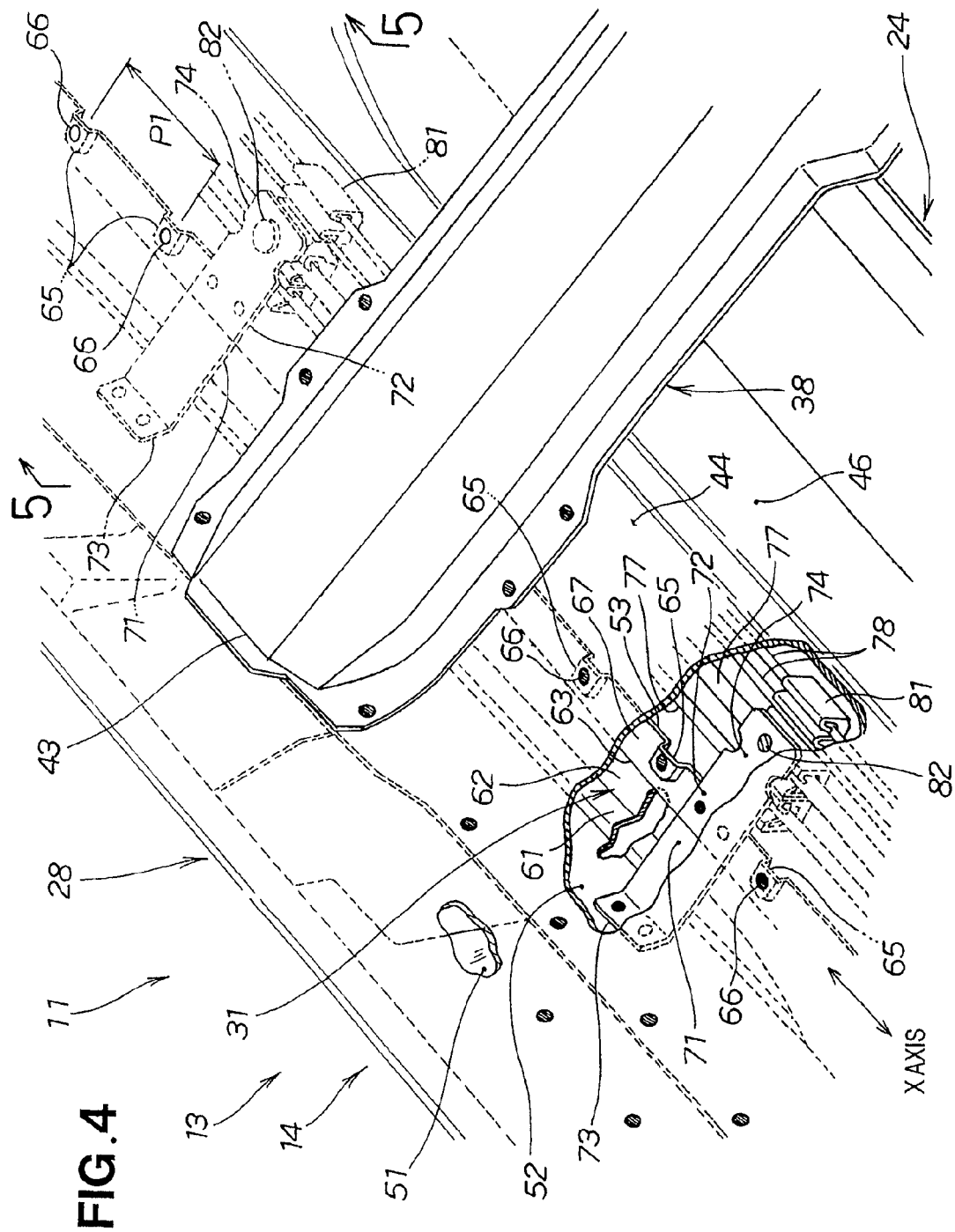
FIG. 4 is a perspective view of a collective piping bracket provided in the vehicle body floor structure of the present invention.
Figure 5:
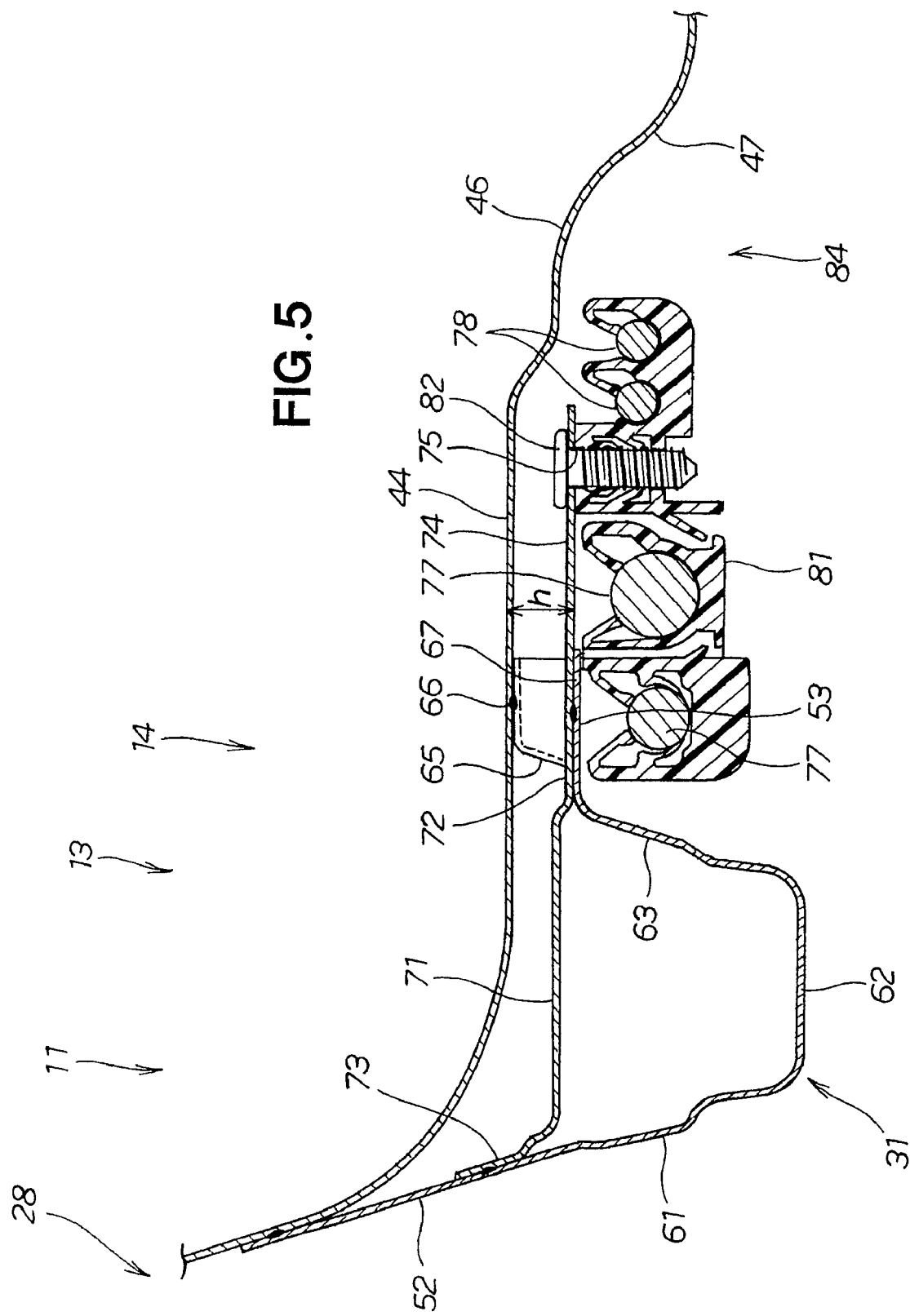
FIG. 5 is a sectional view taken along line 5-5 of FIG. 4.

FIG. 4 is a perspective view of a collective piping bracket provided in the vehicle body floor structure 11, and FIG. 5 is a sectional view taken along the 5-5 line of FIG. 4.

The tunnel frame 31, extending in the longitudinal or length direction (X-axis direction) of the vehicle as a floor frame, has a substantial U cross sectional shape (i.e., upwardly-oriented U sectional shape as viewed transversely to the longitudinal axis of the frame 31). The tunnel frame 31 has a first flange 52 fixedly joined to a side wall portion 51 of the tunnel section 28 and to the outer surface 47 of the floor panel 44, and a second flange 53 fixedly joined at intervals to the outer surface 47 of the floor panel 44.

More specifically, the tunnel frame 31 has a first side portion 61 integrally connecting to the first flange 52 fixedly joined to the tunnel section 28, and a second side portion 62 and third side portion 63 sequentially integrally connecting to the first side portion 61. The first, second and third side portions 61, 62 and 63 together constitute a channel-like or substantial U cross-sectional shape, and the second flange 53 integrally connects to the third side portion 63 and disposed in opposed relation to the outer surface 47 of the floor panel 44.

The second flange 53 is of a concavo-convex shape having a plurality of welding convex or high-height portions 65 at predetermined intervals (e.g., at predetermined pitches P1) along the length direction of the vehicle, and each of the welding convex portions 65 has a predetermined height h. The second flange 53 is fixedly joined by welding only at the welding convex portions 65 to the outer or lower surface of the floor panel 44 (thereby forming welded portions 66), and most of the upper surface of the second flange 53 except for the upper surface of the welding convex portions 65 are spaced from the floor panel 44 by a distance corresponding to the height h to thereby provide opening surfaces (or concave or low-height portions) 67. The collective piping bracket 71 is fixedly joined to the opening surface 67.

The collective piping bracket 71, which has a plate shape, has a middle fixing portion 72 fixedly joined to the opening surface 67 of the tunnel frame 31, and has a fixing end 73 fixedly joined to the first flange 52 of the tunnel frame 31. The collective piping bracket 71 also has a piping support portion 74 integrally connecting to the middle fixing portion 72. The piping support portion 74 has an engaging hole 75 formed therein, and a pipe/electric wire clamp member 81, holding a pipe 77 and electric wires 78, is engaged on the piping support portion 74 via a pin 82.

The following paragraphs describe behavior of the vehicle body floor structure according to the present invention.

FIG. 6 is a view showing a vibration absorbing mechanism of the vehicle body floor structure 11. When the pipe 77 and electric wires 78, disposed in a bottom section 84 of the vehicle 12, vibrate as indicated by an arrow b1 during travel of the vehicle 12, the vibrations are transmitted in the vehicle body floor structure 11 from the collective piping bracket 71 to the tunnel frame 31 as indicated by arrows b2 and b3, but never transmitted to the floor panel 44 spaced apart from the collective piping bracket 71. Thus, the vehicle body floor structure 11 can effectively suppress the vibrations from the pipe 77 and electric wires 78 disposed in the bottom section 84 of the vehicle 12.

Namely, in the vehicle body floor structure 11, the vibrations transmitted from the collective piping bracket 71 to the tunnel frame 31 as indicated by arrows b2 and b3 are attenuated while being transmitted through the tunnel frame 31, and thus, the vibrations can be effectively prevented from being transmitted from the first flange 52 to the floor panel 44. As a result, even when the pipe 77 and electric wires 78 have vibrated, the vehicle body floor structure 11 can effectively suppress or prevent the vibrations from being transmitted to the floor panel 44.

In other words, because the collective piping bracket 71 is connected only to the tunnel frame 31 of a relatively great mechanical strength and rigidity without being connected to the floor panel 44, vibrations from the collective piping bracket 71 would not be transmitted to the floor panel 44.

Further, with the vehicle body floor structure 11, where the collective piping bracket 71 is joined to the tunnel frame 31 by welding, no particular vibration absorbing member has to be provided between the piping bracket 71 and the floor panel 44, it is possible to significantly reduce necessary manufacturing cost.

INDUSTRIAL APPLICABILITY

The vehicle body floor structure of the present invention is particularly useful for use in vehicles.

The invention claimed is:

1. A vehicle body floor structure (11) comprising:
a floor frame (31) of upwardly-oriented U-shaped section disposed on a floor panel (44) provided in a floor section of a compartment (13) of a vehicle (12), the floor frame (31) having a first flange (52) and a second flange (53) which are provided at ends of the U shape; and
a collective piping bracket (71) disposed under the floor panel (44) between the second flange (53) of the floor frame (31) and an outer surface (47) of the floor panel (44), the collective piping bracket (71) being fixedly joined to the second flange (53) of the floor frame (31) and spaced apart from the floor panel (44).

2. The vehicle body floor structure of claim 1, wherein the second flange (53) of the floor frame (31) is of a concavo-convex shape having a low-height portion (67) and a high-height portion (65) and is welded at the low-height portion (67) to the collective piping bracket (71) and welded at the high-height portion (65) to the floor panel (44).

3. The vehicle body floor structure of claim 1, wherein the collective piping bracket (71) is fixed to both of the first flange

(52) and the second flange (53) of the floor frame (31), the second flange (53) being spaced apart from the first flange (52).

4. The vehicle body floor structure of claim 1, further comprising a tunnel section (28) extending longitudinally of the vehicle (12) and having side walls, wherein the floor frame (31) is provided at ends of the side walls of the tunnel section (28) and extending along the tunnel section (28).

5. The vehicle body floor structure of claim 4, further comprising a side sill (34) extending rearwardly of the vehicle (12), wherein the side walls of the tunnel section (28) are formed by a step higher than a floor panel portion fixed to the side sill (34).

* * * * *